Oct. 4, 1938.   C. DOERING ET AL   2,132,099
METHOD OF AND APPARATUS FOR PURIFYING DAIRY PRODUCTS
Filed Aug. 23, 1934   5 Sheets-Sheet 4
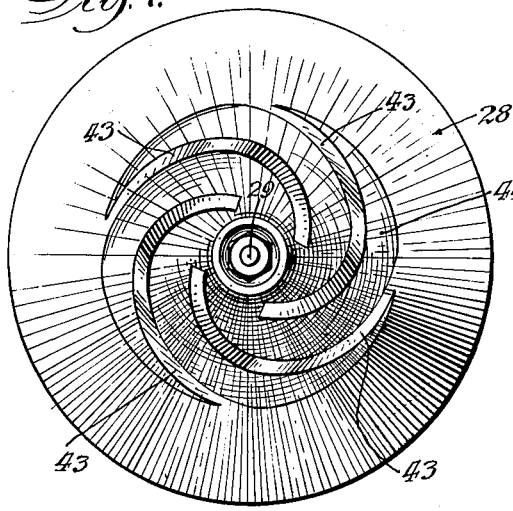
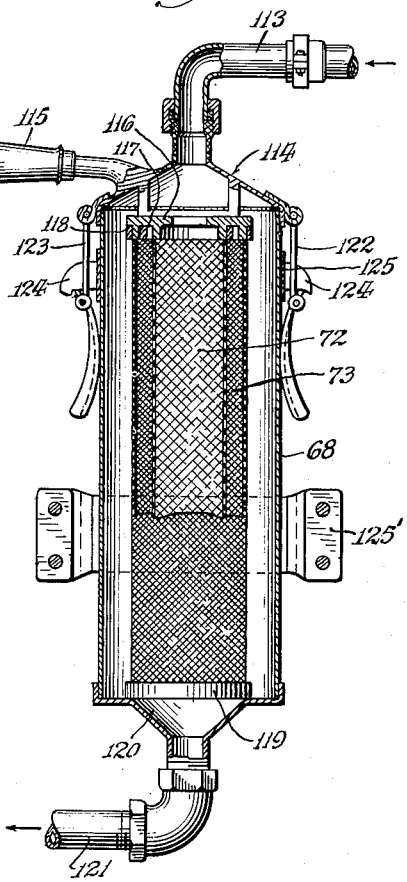
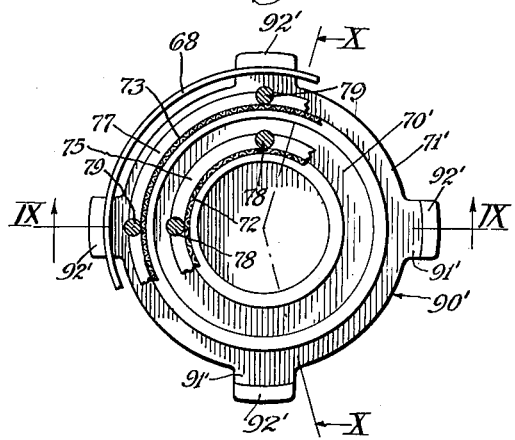
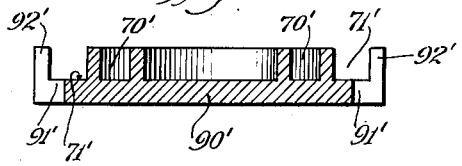
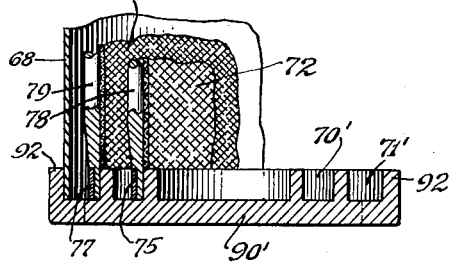

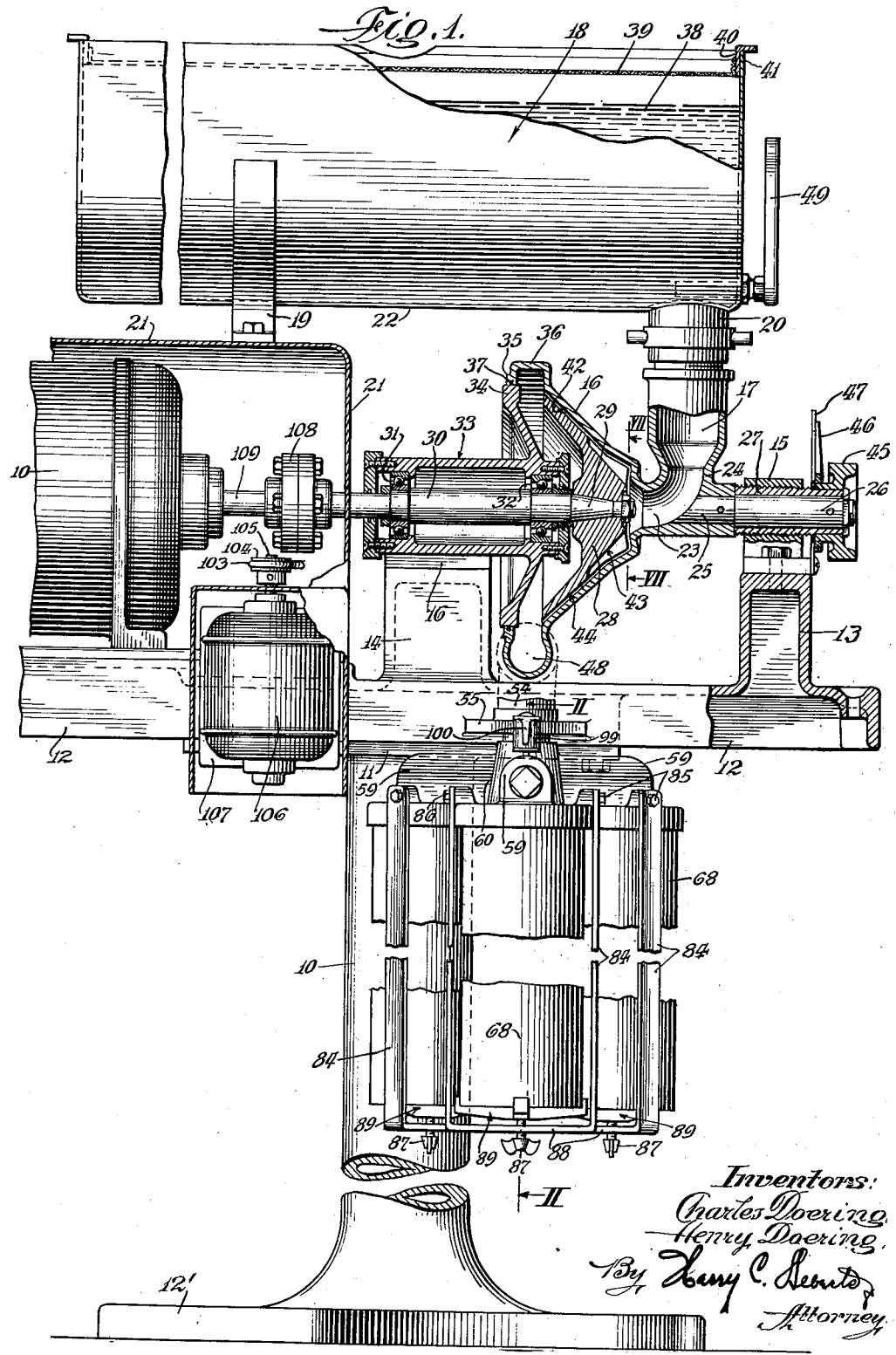

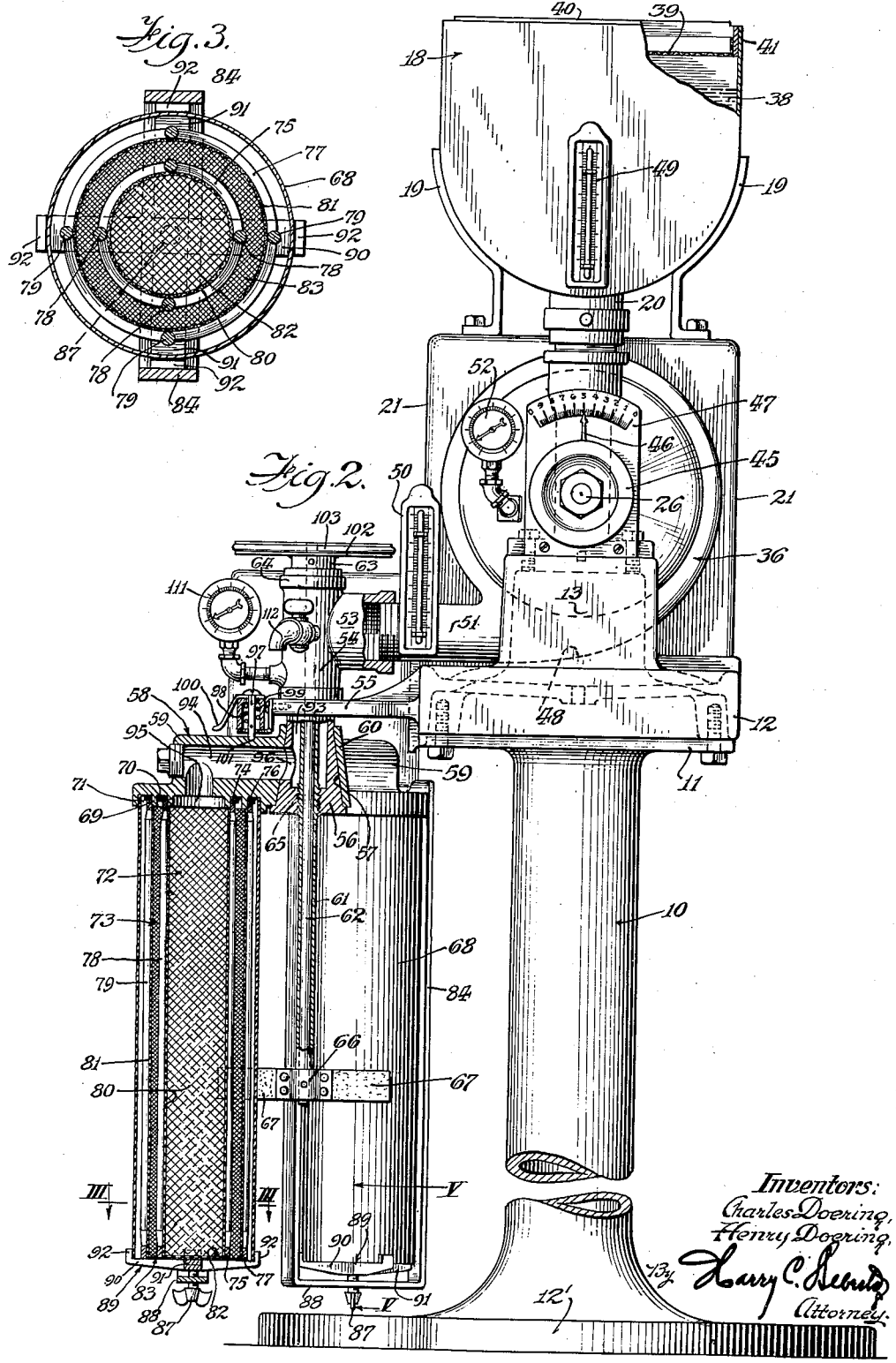

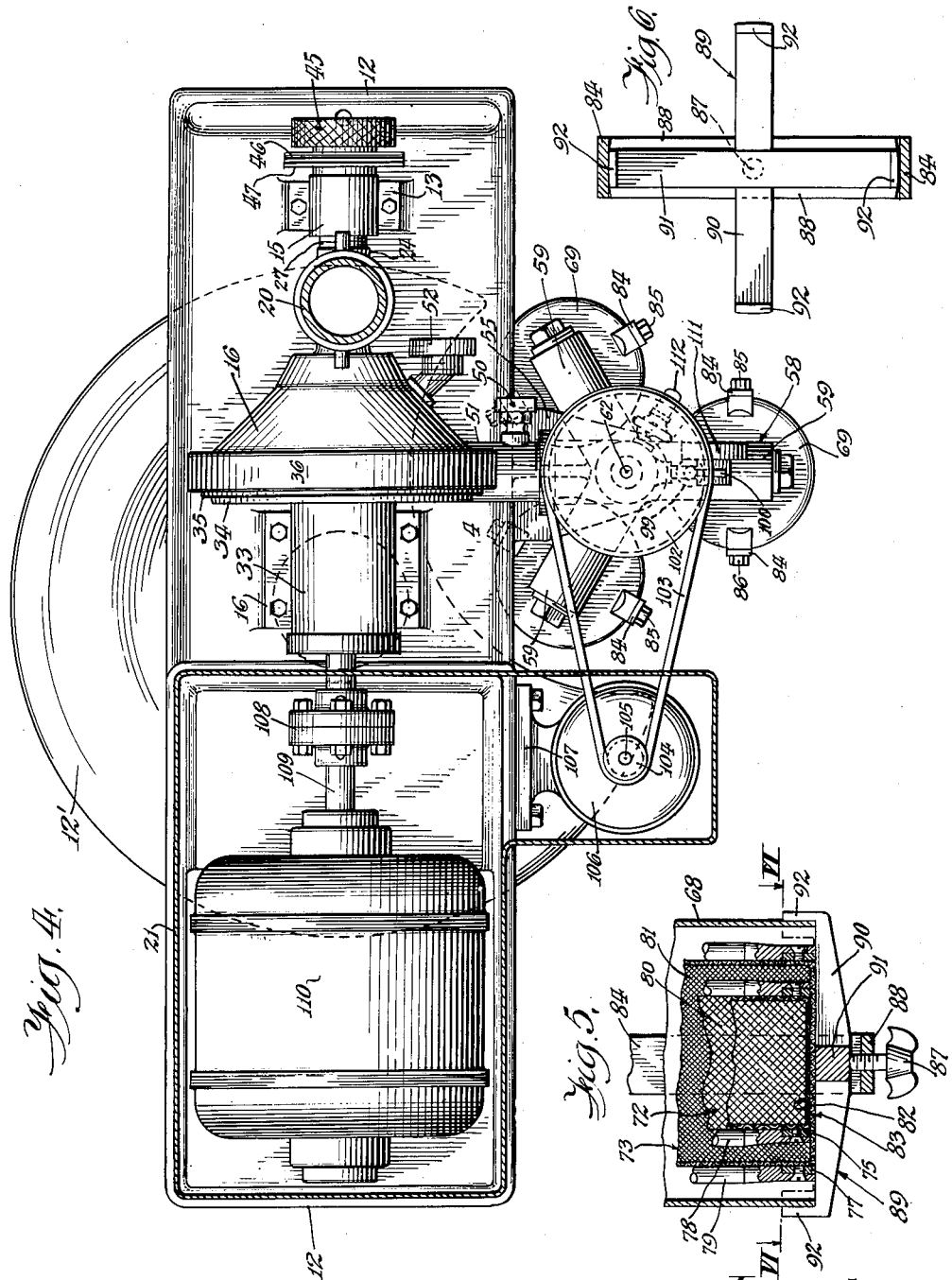

Oct. 4, 1938.   C. DOERING ET AL   2,132,099
METHOD OF AND APPARATUS FOR PURIFYING DAIRY PRODUCTS
Filed Aug. 23, 1934   5 Sheets-Sheet 5
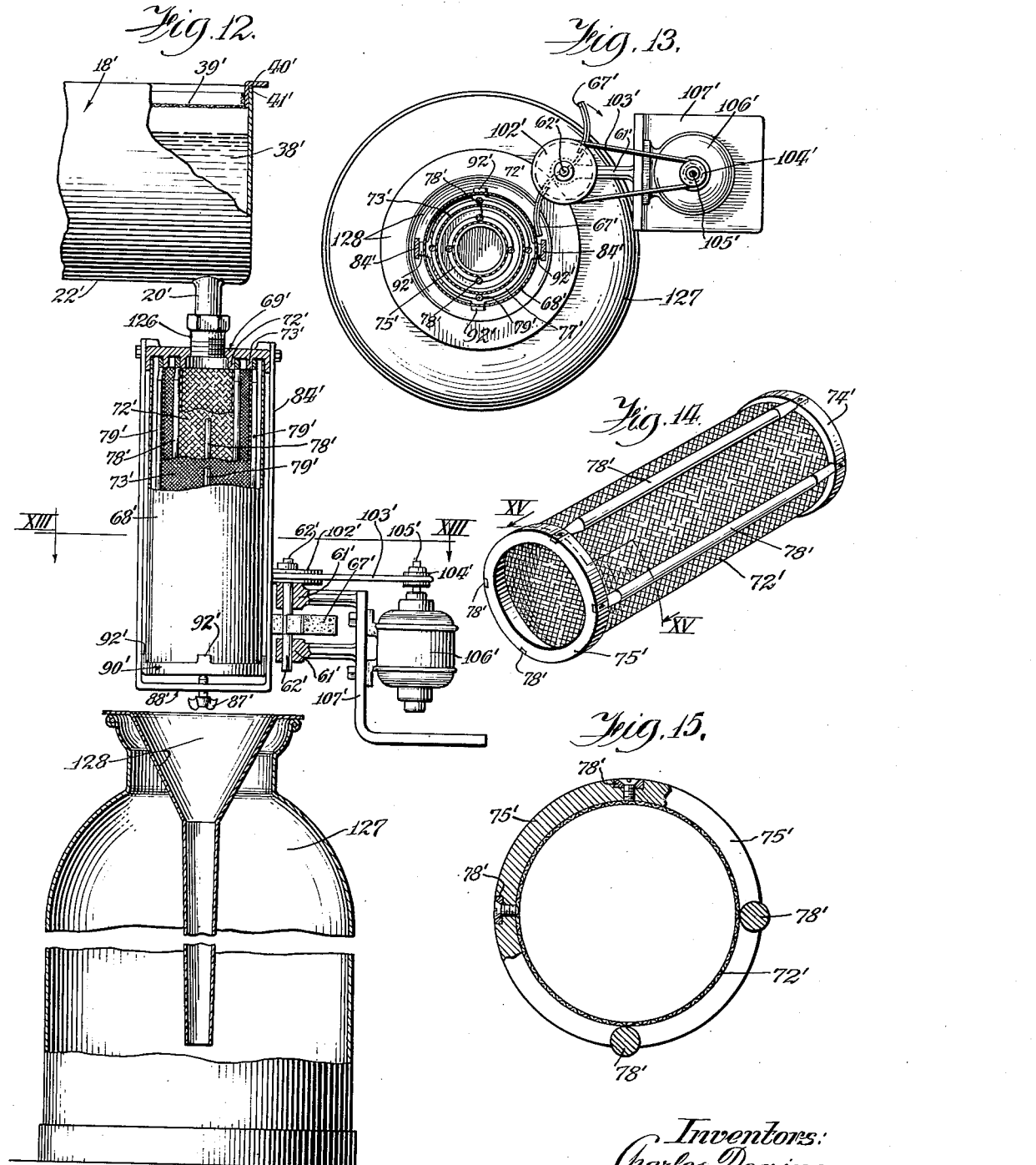

Patented Oct. 4, 1938

2,132,099

UNITED STATES PATENT OFFICE 2,132,099

METHOD OF AND APPARATUS FOR PURIFYING DAIRY PRODUCTS

Charles Doering and Henry Doering, Chicago, Ill.

Application August 23, 1934, Serial No. 741,103

4 Claims. (Cl. 210—183)

This invention relates to purifying devices and more particularly to machines for removing foreign matter from edible substances such as cream and similar dairy products preparatory to the processing thereof, although it may be employed with equal advantage for other purposes.

It contemplates more especially the provision of means for extracting the impurities and foreign matters from substances without resort to pressure sieves and similar expedients heretofore employed for that purpose, thereby insuring utmost sanitation, continuous operation and improvement in the qualities of such products.

Dairy products such as cream, butter and kindred edible foods customarily contain comparatively large quantities of foreign substances besides the usual micro-organisms that are eliminated or at least rendered inactive by pasteurization. Pasteurization tends to preclude or at least retard deterioration occasioned by bacteria infestation responsive to natural bacteria decay over an extended period of time, but dairy products like cream contain many additional foreign substances which are inherent therein or are intermixed therewith during the handling thereof and exposure to the atmosphere environs that are anything but sterile or clean. Fundamentally, the difficulty of cleansing cream or other dairy products with a pressure sieve or other known expedients is the inability to prevent the foreign constituents from being passed therethrough with the liquid to be cleansed, for the dairy products like cream consist of fat globules having a strong affinity for all foreign substances such as slime, insect bodies, ant eggs, nucro-organisms, dirt from the atmosphere or included therein by hand contact in cow milking, and such other undesirable matter that is usually prevalent around farms, pasteurizing equipment, dairies and the creameries. There has been the practice, therefore, of employing pressure sieves and strainers after heat pasteurization in an attempt to remove these foreign substances, but such expedients require intermittent replacements and the foreign substances for the most part pass through with the fat globules so that this is not productive of uniformity or any appreciable purification. Then, too, the incorporation of chemicals is quite essential with customary processes of attempted purification, but this is accomplished at the expense of adulteration, which for the most part is prohibited by the pure food laws.

As a consequence the known devices for effecting purification which require the subjection of the dairy products to crude methods of straining and pressure expedients have not acquired perfection from both the standpoint of continuous production and cleanliness in the resulting product. The present invention departs entirely from known processes in that the fat globules comprising the cream or other dairy products are broken up into a vast number of minute particles incident to processing to insure the separation of the foreign substances therefrom and impart increased smoothness thereto responsive to the purification thereof without resort to adulterants such as chemicals or pressure strainers. Moreover, edible dairy products are rendered more stable and improved in texture, color and odor by the subjection thereof to purification in a manner prescribed by the teachings of the instant invention, which is productive of a decidedly superior product from a sanitary and taste standpoint.

Dairy products are especially appetizing when possessed of a fine consistency and purified to a degree that enables the decidedly improved taste owing to the purity and more or less emulsified condition thereof which results from processing in accordance with the teachings of the present invention. The keeping qualities and texture thereof are enhanced even more by resort to primarily mechanical rather than thermal processing to impart utmost purity and an accentuated homogenous consistency with better keeping qualities to the natural dairy product. Improved texture with enhanced taste characteristics and purity are acquired without interfering with continuous production operations and undesirable pressure and/or crude strainers have been dispensed with. Thus, a completely pure and pasteurized product is produced without the slightest adulteration or processing impairment in that such is effected in continuous sequence with the steps of initial pasteurization subsequent purification treatment.

One object of the present invention is the provision of means for pasteurizing and emulsifying dairy products and effecting the purification thereof to insure complete homogeneity, purity and an improved product.

Another object is to provide means for continuously affecting the pasteurization and purification of dairy products without resort to pressure strainers.

Still another object is the provision of means for improving dairy products by thorough mechanical rather than chemical purification thereof.

A further object is the provision of means for more satisfactorily pasteurizing and purifying edible plastics by the subjection thereof to improved mechanical expedients for accomplishing that purpose.

A still further object is to provide novel mechanical means for purifying edible dairy products to improve the texture and taste qualities thereof.

Still a further object is the provision of a novel combination of elements for mechanically purifying edible liquid substances resulting in a superior product having improved keeping qualities, improved taste, better texture and a more desirable color than in its initial or natural state.

An additional object is to provide means for breaking down the constituents of liquid dairy products into particles more minute than the foreign substances therein contained and then removing the foreign substances without resort to pressure filters or strainers.

Other objects and advantages will appear from the following description of an illustrated embodiment of the present invention.

In the drawings:

Figure 1 is a side view in elevation of a device embodying features of the present invention, parts thereof being broken away to clarify the showing.

Figure 2 is a front view in elevation of the device shown in Figure 1 with a section taken substantially along line II—II thereof, there being parts broken away to clarify the showing.

Figure 3 is a sectional view taken substantially along line III—III of Figure 2.

Figure 4 is a plan view of the machine shown in Figures 1 and 2.

Figure 5 is a sectional view of the feeding device taken substantially along line V—V of Figure 2.

Figure 6 is a sectional view taken substantially along the irregular or offset line VI—VI of Figure 5.

Figure 7 is a front view of a rotor member taken substantially along line VII—VII of Figure 1.

Figure 8 is an enlarged fragmentary view of a modified strainer support, parts thereof being broken away to clarify the showing.

Figure 9 is a sectional view of the strainer support taken substantially along line IX—IX of Figure 8.

Figure 10 is a sectional view taken substantially along line X—X of Figure 8.

Figure 11 is a sectional view in elevation of a strainer cleanser for use in connection with the strainers shown herein.

Figure 12 is a fragmentary view in elevation of a modified embodiment of the present invention, parts thereof being broken away and certain others shown in section to clarify the showing.

Figure 13 is a sectional view taken substantially along line XIII—XIII of Figure 12.

Figure 14 is a perspective view of the strainer embodying features of the present invention and utilized in conjunction with the device shown in Figures 1, 2 and 12.

Figure 15 is a sectional view taken substantially along line XV—XV of Figure 14.

The structure selected for illustration comprises a standard 10 of any suitable construction which extends vertically from the floor or other foundation to terminate in an enlarged flange 11 stabilized by a base 12' or as commercial practice may dictate. A frame 12 is fitted for attachment to the flange 11 of the standard 10 to provide a rigid and non-vibrating support for instrumentalities to be hereinafter described. To this end, the frame 12 has a pair of upstanding brackets 13 and 14 which serve to support bearing members 15 and 16, respectively, thereby sustaining horizontally aligned bearings with auxiliary instrumentalities as will appear more fully hereinafter.

As shown, liquid treating housing 16 has a feeding conduit 17 which extends in a vertically upward direction for communication with the interior thereof to direct the dairy products from any suitable source of supply to the interior of the housing 16. In order to enable the liquid or other substance to be supplied to the feeding conduit 17, a substantially rectangular or elongated receptacle 18 is mounted thereabove by means of brackets 19 and a coupler 20 which is in threaded engagement with the conduit 17, the bracket 19 depending to a motor housing 21 to effect the rigid horizontal support thereof. A suitable opening corresponding in dimensional extent and contour to the interior of the feeding conduit 17 is provided in the bottom 22 of the receptacle 18 for communication therewith so that a large volume of the liquid or other substance to be processed and purified may conveniently and readily be supplied to the treatment housing 16 for traverse and feeding along a predetermined path in a manner and for a purpose that will appear more clearly hereinafter.

The treatment housing 16 has, in this instance, a tubular entrant passage 23 provided in a member 24 which provides a horizontally extending stub shaft 25 having an extension 26 with an externally threaded sleeve 27 fixed thereon. The bearing 15 is internally threaded to engage the sleeve 27, thereby supporting the front end of the housing 16 and the receptacle 18. A frusto-conical body or rotor member 28 is fixed to the extremity 29 of a shaft 30 fitted with spaced bearings 31 and 32 for journalled support in a cylindrical member 33. The cylindrical member 33 has an enlarged peripheral flange 34 which confronts the peripheral edge 35 of the liquid treatment chamber annulus 36, there being a peripheral packing member 37 therebetween so that the flange 34 will serve to hermetically close the large end of the housing annulus 36 and support the rotor 28 in a position complemental to the interior of the housing 16 to co-operate therewith so as to rotate relative thereto with the passage of the liquid 38 from the receptacle 18 therebetween for discharge to the treatment housing annulus 36.

A comparatively coarse screen 39 fitted to a frame 40 is supported by the peripheral edge 41 of the receptacle 18. Cream or similar dairy products is taken directly from the pasteurizer or storage where it may have been retained to effect preserved freshness under reduced temperatures, and then directed to the receptacle 18 for initial straining through the wire screen 39 or directly supplied to the entrant orifices of the conduit coupler 20 from storage or the pasteurizer. The substance then flows down the conduit 17 for subjection to a physical pressure reaction which elevates the temperature thereof for mechanical dispersion of the fat globules with incident emulsification and/or pasteurization depending upon the extent of the pressure and degree of constriction. In the present embodiment heat of pasteurization may be developed mechanically incident to the passage of the substance through a constriction or between surfaces in frictional reaction through the medium of the liquid flowing therebetween to effect pasteurization, if desired, during the movement thereof along a predetermined path. This is accomplished by passing successive increments of the substance in a liquid condition through a constriction of any type where heat will be evolved as a consequence thereof, but primarily to reduce the fat globules to minute particles solid which are of less magnitude than the foreign substance therein contained.

In order to effect the traverse of the liquid through a constriction for breaking down the fat globules and, if desired, creating heat of pasteurization incident to the traverse thereof, the cream or other dairy product flows under the influence of gravity to the conduit 23 which communicates with the apex of the conical rotor 38 splined or otherwise fixed to the shaft extremity 29 for rotation therewith in proximity to the correspondingly shaped interior surface 42 of the treatment housing 14, thereby defining a minute constriction therebetween for the passage of the edible liquid from the receptacle 18. The conical rotor 28 has helical convolutions in the form of spiral grooves 43 proximate to the apex thereof to enable or institute the travel of the substance between the confronting surfaces 42 and 44 of the treatment housing 16 and rotor 28, respectively, which are in pressure reaction through the medium of the liquid traversing therebetween. The extent of the constriction defined between the surfaces 42 and 44 may be modified to conform with the desired treatment or required heat of pasteurization through the medium of a knurled wheel 45 which is fixed to the sleeve 27 to effect the rotation thereof relative to the shaft 26 and bearing 15 which is in threaded engagement therewith, thereby effecting slight reciprocable movement of the treatment housing 16 axially in the direction of or from the rotor 28. To this end, a pointer 46 is fixed to the adjusting knob 45 for movement therewith and relative to a graduated plate 47 to indicate the adjustment or extent of the constriction between the confronting surfaces 42 and 44 which is a factor of the housing 16 relative to the rotor 28. The packing 37 permits the relative movement between the treatment housing annulus 36 and its closure member 34 constituting a part of the shaft bearing 33.

Rotation of the shaft 30 will effect the traverse of the liquid along the constriction 42—44. Gradually the liquid will build up and densify therealong owing to the progressive lessening depth in the convolution grooves 43 until reaching the smooth or uninterrupted periphery 44 of the rotor 28 for further displacement and substantially increased compression and pressure deformation resulting in the dispersion of the fat globules about the conically arcuate surface thereof to cooperate with the correspondingly shaped surface 42 of the treatment housing 16. As shown, the treatment housing 16 terminates in the enlarged annulus 36 defining a peripheral chamber 48 for the reception of the treated liquid from the constriction 42—44. The liquid is thus subjected to a pressure reaction which in conjunction with the frictional contact of the relatively moving surfaces 42—44 therewith, elevates the temperature of the moving substances to a point of pasteurization, or, if desired, merely sufficient to aid in mechanical dispersion of the fat globules constituting the primary constituent thereof. Fat globule dispersion into minute particles is primarily sought so as to separate such from the foreign matter for eventual removal as will more clearly appear hereinafter.

The degree of temperature elevation and the maintenance thereof at a predetermined magnitude as well as the extent of dispersion may be controlled by the distance of the rotor surface 44 with respect to the interior surface 42 of the housing 16 responsive to adjusting or manipulating the manually operated knob 45 as conditions may require or deem advisable. During this passage of the liquid 38, heat of pasteurization may be, if desired, developed incidental to the rotation of the rotor surface 44 which also serves to effect movement thereof to its periphery for discharge into the chamber 48 to impart improved texture, uniformity and the desired consistency thereto. It is thus apparent that the use of extraneous heat such as steam or any other vapor or heat medium is entirely avoided, and the treatment effected in a manner which imparts complete homogeneity to the resulting product without any possible disintegration or separation of the elements or their composition with the result that the fat globules are finely divided to pass through exceedingly fine strainers so as to extract the foreign matter therefrom.

Discharge of the liquid from the constriction 20 and thence the straining thereof is effected primarily by the centrifugal urge imparted thereto and effective thereon at the periphery responsive to the rotation of the rotor 28. The temperature of the liquid 38 in the receptacle 18 is registered by a thermometer 49. The consequent increase in temperature responsive to the passage through the treatment housing 16 is determined from another thermometer 50 which is located in the discharge pipe 51 in communication with the interior 48 of the housing annulus 36.

The extent of fat globule dispersion and the degree of pressure subjection can be relatively determined from a pressure gauge 52 which is mounted for communication with the interior of the treatment housing 16. The treated liquid is then conveyed to a non-pressure strainer mechanism to be described hereinafter, for the purpose of removing all foreign matter without interfering with continuous treatment described supra. With the indicators described thus far, it will be apparent that uniform regulation is rendered possible through the instant selected adjustment of the various instrumentalities for temperature and pressure maintenance within the required range for procuring the best results.

In order to remove all foreign matter from the treated liquid, the discharge conduit 51 communicates with a pipe 53 comprising a part of a vertical cylindrical pipe housing 54 that is supported by a bracket 55. The bracket 55 is, in this instance, an extension of the frame 12, thereby effecting the rigid support of the cylindrical housing 54, which has a depending extension 56. The extension 56 has a frusto-conical periphery 57 to serve as a vertical end bearing for a liquid distributor housing 58 having radially extending tubular members 59, in this instance three, for rotary support by an axial bearing 60 corresponding in shape and size to serve as a complement for the depending extension 56 of the cylindrical pipe housing 54. The pipe housing 54 has an axial tubular rod bearing and sleeve 61 for journalled support of a rod 62 which is held in position by an end collar 63 resting upon the pipe housing end 64.

The rod bearing and sleeve 61 has an exteriorly threaded enlargement 65 for axial engagement with the bearing extension 56, thereby maintaining such in assembled position with the rotary rod 62 extending therethrough to carry a bracket 66 to which leather straps 67 are radially attached for rotary slapping application to the walls of cylindrical straining housings 68, in this instance three, which are detachably associated with the distributor housing 58 as will appear more fully hereinafter. To this end, the distributor housing 58 has its radially extending tubular distribution members 59 terminating in substantially circular plate members 69 provided, in this instance, with a pair of concentric grooves 70 and 71 in the bottom surface thereof for registry with a pair of cylindrical strainers 72 and 73, respectively.

The cylindrical strainers 72 and 73 are maintained rigid by means of circular end rings 74—75 and 76—77 which are concentrically sized in diameter to correspond with the grooves 70 and 71, respectively, and these are maintained in rigid spaced relation by rods 78 and 79 which bridge the ring members 74—75 and 76—77, respectively, so as to define a framework for the strainer walls 80 and 81 and their respective strainer bottoms 82 and 83, thereby defining the cylindrical strainers 72 and 73, respectively. These strainers 72 and 73 are preferably though not necessarily of Monel metal construction with fifty (50) and two-hundred and fifty (250) meshes to the inch respectively. There is no external pressure exerted upon the liquid flowing through these strainers. Gravity alone is relied upon to effect liquid passage through the strainers which are, in effect, non-pressure liquid cleansing expedients.

Many different expedients could be utilized in sustaining the strainers 72 and 73 in concentric relation with their housing 68, and in the present embodiment it is accomplished by means of substantially U-shaped brackets 84 pivoted to each plate member 69 as at 85 and 86 to carry a thumb stud 87 through the bottom thereof. The thumb studs 87 co-operate with a bottom bracket 89 comprising cross-members or straps 90 and 91 having upturned extremities 92 for reception of the strainer housing 68 thereon and concentrically with the strainers 72 and 73 which are in registry with the grooves 70 and 71 provided in the plate members 69 and thus held in detachable spaced relation through the adjustability of the thumb stud 87.

Another type of bottom bracket is shown in Figures 8 and 9, it comprising a plate 90' having concentric grooves 70' and 71' to confront the grooves 70 and 71 in the distributor plates 69. Radially extending ears 91', in this instance four, terminate in upturned extremities 92' for reception of the strainer housing 68 thereon and concentrically with the strainers 72 and 73 for support by the U-shaped bracket 84 or any other expedient to accomplish that purpose. The strainer housings 68 and cylindrical strainers 72 and 73 are thus rendered detachable for cleansing and sterilizing purposes as will appear more fully hereinafter.

Now, then, the vertical bearing 54 is tubular to define a communicating passage 93 with the conduit 53 to effect or enable the flow of the treated cream or other liquid to the radial distributor member 58 having their tubular interior 94 in communication therewith. The distributors 58 are thus in communication and establish a passage with the interior of the strainer housings 68 through the axial ports 95 in distributor plates 69. Flow of the treated liquid is maintained with only one housing 68 at a time, since the tubular bearing extension 56 has a single transverse port 96 which is capable of registry with only one distributor member 58. To insure correct registry of one distributor 58 for rotary displacement to effect successive registry as desired, a spring impelled detent 97 having an enveloping spring 98 is confined in a housing 99 for attachment to the frame bracket 55. A lever 100 is connected to the detent 97 above its housing 99 to enable the vertically upward displacement thereof against the urge of the spring 98, thereby removing the pin or detent 97 from an aperture or concavity 101 provided in the top surface of each distributor 58. Consequently, successive registry is established and the treated liquid flows through the strainer housings 68 for removal of the foreign matter therefrom.

The passage of the treated liquid through the strainers 72 and 73 is assisted by a slight vibratory movement imparted to the strainer housings 68 by the rotating slapping straps 67 which are driven by the shaft 62 having a pulley 102 carries a belt 103 which is in peripheral contact with a smaller pulley 104 fixed to the armature shaft 105 of a motor 106. The motor 106 has a bracket 107 to enable the attachment to the frame 12 which has an enclosing housing 107 for the motor 106. Similarly, the drive shaft 30 of the rotor 28 terminates in a coupler 108 which enables the connection thereof to an armature shaft 109 of a large motor 110 mounted on the frame 12 for enclosure by the housing 12 which in part supports the receptacle 18 through the brackets 19.

The motors 106 and 110 may be controlled from a single switch or otherwise as commercial practice may dictate. A pressure gauge 111 is preferably provided in the vertical bearing 54, communication with the interior passage 93 thereto to determine the pressure of the flow as the emulsifying treatment is ended. Then, too, a spigot 112 is preferably provided for attachment to the vertical bearing 54 so as to effect communication with the interior passage 93 thereof to allow a sample of the liquid to be removed at any time for test and observation purposes. It will thus be apparent that a very novel method of treating liquids, such as cream and similar dairy products, has been provided so as to break down the fat globules into minute particles and thus allow their passage through very fine strainers 72 and 73, with all foreign substance retained therein to effect the continuous purification thereof in that the strainer housing 68 may successively be brought in operation while those already used may be cleansed and sterilized by subjection to any cleansing fluid or treatment.

The cleansing treatment may involve the removal of the already used strainer housing 68 together with their cylindrical strainers 72 and 73 for subjection to steam which is supplied to a pipe 113 having communication with a closure member 114, which may serve as the top of a strainer housing 68, together with its cylindrical strainers 72 and 73 confined therein. To this end the closure 114 is provided with a handle 115 to enable the manipulation thereof and the interior of the closure 114 has a plate 116 with concentric grooves 117 and 118 which resemble in appearance and structure the plate member shown in Figure 8. In consequence thereof the strainers 72 and 73 will be held in the desired spaced relation in conjunction with a bottom plate member 119 constructed similarly to plate member 116 to enable the removal of all foreign matter from the strainers 72 and 73 as well as the interior of the strainer housing 68 for passage to a funnel shaped bottom 120 having communication with a pipe 121 for refuse. Any suitable clamp members 122 and 123 may be provided in connection with the top closure 114 for grasping lugs 124 provided on a circular band 125 which is sectional in structure for detachable mounting to the strainer housing 68. A bracket 125' is provided to support the entire structure in any suitable manner so as to provide cleaning means that enable the ready and speedy attachment and detachment of the cylindrical strainers 72 and 73 together with their housing 68. For that matter the cleaning device described above may have its own housing whereon the lugs 124 are permanently attached and thus merely cleanse the strainers 72 and 73 by subjection to steam, while the regular housing 68 may be washed or otherwise rendered sanitary as commercial practice may dictate.

In the modified embodiment shown in Figures 12 and 13, the treatment housing 16 with its auxiliary instrumentalities are entirely dispensed with and the fluid or dairy liquid is passed directly from the receptacle 18' to a strainer housing 68' and its interiorly confined cylindrical strainers 72' and 73'. This is effected by means of a conduit 20' establishing connection with a nipple 126 which is in threaded engagement with the top plate 69', having the features described in connection with the distributor plate 69 in the preferred embodiment. The bracket clamp 84' with its adjustable thumb 87' retains the cleaning housing 68' with its interior strainers 72' and 73' in position. A slapping mechanism is supported by a bracket 60' having vertically aligned bearing 61' for supporting a rod or shaft 62' with leather strap members 67' attached thereto for contact with the wall of the housing 68' to impart the desired vibratory movement thereto.

As shown, a pulley 102' is affixed to the top extremity of the shaft 62' to carry a belt 103' around the periphery of a small pulley 104' fixed to the armature shaft 105' of a motor 106'. The motor 106' has a bracket 107' for attachment to the frame bracket 60', thereby imparting the desired vibratory movement to the strainer housing 68' so that the liquid will flow therefrom with the foreign matter removed by the strainers 72' and 73'. A receptacle such as a milk can 127 may be placed below the strainer housing 68' so as to receive the strained liquid in the funnel shaped member 128 which is supported within the receptacle 127 to avoid foaming of the liquid which flows therethrough.

With this arrangement of parts, it will be apparent that a novel non-pressure straining mechanism of exceedingly high efficiency has been provided to remove the vast amount of foreign matter that is inherent in cream and other dairy substances upon arrival at the creameries for churning into butter or other dairy products. The treatments of the liquids are described in connection with the structural embodiment of the invention disclosed in Figures 1, 2 and 4 also aids in reducing the required time of churning in the production of butter and other dairy products. This coupled with the purity of the product and its improved texture, taste, color and keeping qualities renders such highly desirable over ordinary cream and similar dairy products that are not subjected to the purification treatment herein described.

It should be noted that vitamin "D" may be imparted to the cream before charging the receptacle 18 therewith. Also, cloth strainers may, if desired, be substituted for the metal strainers 72—73 or 72'—73' should commercial practices so dictate. It is significant, too, that the passage of the substance through the constriction defined by the relatively moving surfaces 42—44, produces a galvanic plastic action which prolongs the keeping qualities thereof and aids in the purification thereof in conjunction with the straining effect required by the subsequent passage therethrough.

Various changes may be made in the embodiments of the invention herein specifically described without departing from or sacrificing any of the advantages thereof within the scope of the appended claims.

We claim:

1. A filter unit comprising in combination a series of vertical cylindrical filter chambers located in regular fashion about the centrally vertical axis, means for supporting all of said filter chambers as a group in said position, suitable inlet connections to the upper ends of the filter chambers, suitable delivery connections from the lower ends of the chambers, together with a centrally located slapping device between all of the filter chambers and adapted to act upon said chambers with a slapping action, and means for driving said slapping devices with a rotary movement on the centrally vertical axis as aforesaid substantially as described.

2. A method of treating milk and other lactic products containing fat globules for the purpose of homogenizing and purifying the same, which consists in first subjecting said material to a vigorous homogenizing action for the purpose of homogenizing said material and simultaneously raise its temperature under control due to said action, to thereby improve the condition of the fatty globules for subsequent filtering operation, and which treatment consists in immediately thereafter subjecting such material to a filtering action while at the increased temperature occasioned by said first treatment, substantially as described.

3. A method of treating milk and other lactic products containing fatty globules for the purpose of homogenizing the same and removing foreign matter therefrom which consists in first subjecting said material to a vigorous homogenizing action to thereby homogenize such material and raise the temperature thereof under control to a degree selected for placing the fatty globules in improved condition for subsequent treatment, and which consists in immediately thereafter and at said increased temperature subjecting said material to treatment in a mechanical filtering device for the mechanical removal of foreign impurities therefrom substantially as described.

4. A filter unit comprising in combination a series of vertical filter chambers having within them suitable filtering devices, inlet passages at the upper ends of said chambers, delivery passages at the lower end of the chambers, a central supply passage in close proximity to the upper inlet passages and having a single liquid supply connection together with means for advancing the filter units about the centrally vertical axis as a group to thereby successively place the inlet connections of the filter elements in communication with the supply passage substantially as described.

CHARLES DOERING.
HENRY DOERING.